United States Patent
Abraham et al.

(10) Patent No.: US 10,122,046 B2
(45) Date of Patent: Nov. 6, 2018

(54) ELECTROLYTE COMPOSITIONS FOR HIGH VOLTAGE LITHIUM-ION BATTERIES

(71) Applicant: UCHICAGO ARGONNE, LLC, Chicago, IL (US)

(72) Inventors: Daniel Abraham, Bolingbrook, IL (US); Ye Zhu, San Diego, CA (US)

(73) Assignee: UCHICAGO ARGONNE, LLC, Chicago, IL (US)

(*) Notice: Subject to any disclaimer, the term of this patent is extended or adjusted under 35 U.S.C. 154(b) by 266 days.

(21) Appl. No.: 14/506,316

(22) Filed: Oct. 3, 2014

(65) Prior Publication Data
US 2016/0099484 A1 Apr. 7, 2016

(51) Int. Cl.
H01M 10/00 (2006.01)
H01M 10/0567 (2010.01)
H01M 10/0569 (2010.01)
H01M 10/0568 (2010.01)
H01M 10/0525 (2010.01)

(52) U.S. Cl.
CPC ... H01M 10/0567 (2013.01); H01M 10/0525 (2013.01); H01M 10/0568 (2013.01); H01M 10/0569 (2013.01); H01M 2300/0037 (2013.01)

(58) Field of Classification Search
CPC ......... H01M 10/0569; H01M 10/0568; H01M 10/05; H01M 2300/0028
USPC ....................................................... 429/149
See application file for complete search history.

(56) References Cited

U.S. PATENT DOCUMENTS

| | | | |
|---|---|---|---|
| 5,891,592 A | 4/1999 | Mao et al. | |
| 7,354,680 B2 | 4/2008 | Mikhaylik | |
| 2010/0279155 A1 | 11/2010 | Scott et al. | |
| 2012/0088161 A1* | 4/2012 | Yoon ..................... | H01M 4/622 429/332 |

FOREIGN PATENT DOCUMENTS

| | | |
|---|---|---|
| CN | 101882696 | 11/2010 |
| JP | 2010212153 | 9/2010 |
| JP | 2010212153 A | 9/2010 |
| JP | 2010251313 A | 11/2010 |

(Continued)

OTHER PUBLICATIONS

Machine translation of JP 2002358999 A, obtained Jul. 26, 2016.*

(Continued)

*Primary Examiner* — Nicholas P D'Aniello
*Assistant Examiner* — Abibatu O Ojo-Amoo
(74) *Attorney, Agent, or Firm* — Olson & Cepuritis, Ltd.

(57) ABSTRACT

The present invention provides an electrolyte composition for a lithium-ion battery comprising $LiPF_6$ in a liquid carrier comprising a carbonate ester and an unsaturated organoboron compound comprising two or three unsaturated hydrocarbon groups, each unsaturated hydrocarbon group being covalently bonded to a boron atom. The unsaturated hydrocarbon groups are independently selected from vinyl, allyl, propargyl, substituted vinyl, substituted allyl, and substituted propargyl. The substituents of the substituted vinyl, allyl and propargyl groups independently comprise one or more of alkyl and phenyl. The alkyl and phenyl groups optionally can bear one or more substituent selected from halogen (e.g., F), hydroxy, amino, alkoxy, and perfluoroalkoxy.

20 Claims, 5 Drawing Sheets

(56) References Cited

FOREIGN PATENT DOCUMENTS

| WO | 2002358999 | A1 | 12/2002 |
| WO | 2010126631 | A1 | 11/2010 |
| WO | 2012133556 |    | 10/2012 |
| WO | 2012133556 | A1 | 10/2012 |

OTHER PUBLICATIONS

Machine translation of CN 101882696 A, obtained Jul. 26, 2016.*
Allen, J.L et al., Crystal Structure and Physical Properties of Lithium Difluoro(Oxalato)Borate (LiDFOB or LiBF2Ox), Journal of Power Sources 196, 9737-9742 (2011).
Beckett, M.A. et al., Synthesis and Lewis Acidity of Triorganosilyl and Triorganostannyl Esters of Orthoboric, Metaboric, and Arylboronic Acids, Journal of Organometallic Chemistry 588, 107-112 (1999).
Horino, T. et al., High Voltage Stability of Interfacial Reaction at the LiMn2O4 Thin-Film Electrodes/Liquid Electrolytes with Boroxine Compounds, Journal of the Electrochemical Society, 157 (6), A677-A681 (2010).
Kato, Y. et al., Influence of Lewis Acidic Borate Ester Groups on Lithium Ionic Conduction in Polymer Electrolytes, J. Mater. Chem. 13, 280-285 (2003).
Kerins, F. et al., Generation of Substituted Styrenes via Suzuki Cross-Coupling of Aryl Halides with 2,4,6-Trivinylcyclotriboroxane, J. Org. Chem. 67, 4968-4971, (2002).
Korich, A.L. et al., Boroxine Chemistry and Applications: A Perspective, The Royal Society of Chemistry, Dalton Trans. 39, 1423-1431 (2010).
Mathews, K.L. et al., Solid Polymer Electrolytes Which Contain Tricoordinate Boron for Enhanced Conductivity and Transference Number, J. Mater. Chem. A., 1, 1108-1116 (2013).
Matsumi, N. et al., Ion Conductive Characteristics of Alkylborane Type and Boric Ester Type Polymer Electrolytes Derived From Mesitylborane, Macromolecules 36, 2321-2326 (2003).
Mehta, M.A. et al., Li+ Transference Number Enhancement in Polymer Electrolytes by Incorporation of Anion Trapping Boroxine Rings Into the Polymer Host, Chemistry Letters, 915-916 (1997).
Nair, N.G. et al., Fluorinated Boroxin-Based Anion Receptors for Lithium Ion Batteries: Fluoride Anion Binding, Ab Initio Calculations, and Ionic Conductivity Studies, J. Phys. Chem. A, 113, 5918-5926 (2009).
Reddy, V.P. et al., Boron-Based Anion Receptors in Lithium-Ion and Metal-Air Batteries, Journal of Power Sources 247, 813-820 (2014).
Shkrob, I.A. et al., Reduction of Carbonate Electrolytes and the Formation of Solid-Electrolyte Interface (SEI) in Lithium-Ion Batteries. 1. Spectroscopic Observations of Radical Intermediates Generated in One-Electron Reduction of Carbonates, The Journal of Physical Chemistry 117, 19255-19269 (2013).
Shkrob, I.A. et al., Reduction of Carbonate Electrolytes and the Formation of Solid-Electrolyte Interface (SEI) in Lithium-Ion Batteries. 2. Radiolytically Induced Polymerization of Ethylene Carbonate, The Journal of Physical Chemistry 117, 19270-19279 (2013).
Tanaka, Y. et al., Electrochemical Stability of an Electrolyte of LiPF6 in Carbonate Ester Containing Trialkoxyboroxine With LiNi0.5Mn1.5O4 Cathode, The Electrochemical Society, Abstract #1232, Honolulu PRiMe (2012).
Zhou, F. et al., Boroxine Ring Compounds as Dissociation Enhancers in Gel Polyelectrolytes, Electrochimica Acta 48, 1749-1758 (2003).
Zhu, Y. et al., Positive-Electrode Passivation by LiDFOB Electrolyte Additive in High-Capacity Lithium-Ion Cells, Journal of the Electrochemical Society 159, (12), A2109-A2117 (2012).

* cited by examiner

ELECTROLYTE COMPOSITIONS FOR HIGH VOLTAGE LITHIUM-ION BATTERIES

CONTRACTUAL ORIGIN OF THE INVENTION

The U.S. Government has rights in this invention pursuant to Contract No. DE-AC02-06CH11357 between the U.S. Government and UChicago Argonne, LLC representing Argonne National Laboratory.

FIELD OF THE INVENTION

This invention relates to electrolytes for lithium-ion batteries. More specifically this invention relates to electrolytes comprising unsaturated organoboron additives useful in high voltage lithium-ion batteries.

BACKGROUND OF THE INVENTION

Lithium and lithium ion batteries (collectively referred to herein as "lithium battery", "LIB" and grammatical variations thereof) are playing an increasingly important role as power sources for electronic devices and electric vehicles. Development of LIBs with higher energy and/or power densities than the current generation of batteries is an active field of research. Such "high voltage" batteries can be made smaller and lighter than the current standard, which is extremely desirable, e.g., for vehicular uses and for personal electronic devices. Cell energy is governed by the equation $E_{cell}=Q \times (\nabla - i\overline{R})$, where Q is capacity, $\nabla$ is voltage, i is current and $\overline{R}$ is resistance. High energy cathodes comprising various transition metal oxide materials have been identified, which need to be cycled at high voltages (greater than about 4.5 V) to achieve suitably high energy densities. Examples of such materials include, e.g., lithium nickel/manganese/cobalt oxide-graphite cells such as $Li_{1.2}Ni_{0.15}Mn_{0.55}Co_{0.1}O_2$ / carbon (cathode)-graphite (anode) cells. Unfortunately, high voltage cycling can lead to increases in electrolyte oxidation and acceleration of transition metal oxide dissolution. Stable solid electrolyte interface (SEI) passivation layers at the positive and negative electrodes can ameliorate some of these undesirable effects. Consequently, there is an ongoing need for electrolyte compositions that promote stable SEI formation in high voltage LIB applications. The electrolyte compositions described herein address this ongoing need.

SUMMARY OF THE INVENTION

In one embodiment, the present invention provides an electrolyte composition for a lithium-ion battery. The composition comprises $LiPF_6$ in a liquid carrier comprising a carbonate ester and an unsaturated organoboron compound comprising two or three unsaturated hydrocarbon groups (e.g., trivinylboroxine, trivinylborane, triallylboroxine, triallylborane, tripropargylboroxine, tripropargylborane, and the like). Each unsaturated hydrocarbon group is covalently bonded to a boron atom of the organoboron compound. The unsaturated hydrocarbon groups independently can be selected from vinyl, allyl, propargyl, substituted vinyl, substituted allyl, and substituted propargyl. The substituents of the substituted vinyl, allyl and propargyl groups independently comprise one or more moieties selected from alkyl (e.g., $C_1$ to $C_6$ alkyl) and phenyl. The alkyl and phenyl groups optionally can bear one or more substituents selected from halogen (e.g., F, Cl, Br), hydroxy, amino (e.g., primary, secondary or tertiary amino groups), alkoxy (e.g., $C_1$ to $C_6$ alkoxy), and perfluoroalkoxy (e.g., $C_1$ to $C_6$ perfluoroalkoxy).

In any of the embodiments described herein, the carbonate ester can comprise, e.g., at least one compound selected from ethylene carbonate (EC), propylene carbonate (PC), dimethyl carbonate (DMC), and ethyl methyl carbonate (EMC). The carbonate ester can be a single carbonate ester or can be a mixture of two or more carbonate esters (e.g., a mixture of EC and EMC). In some embodiments the mixture of carbonate esters can comprise less than 50 percent by weight (wt %) EC and greater than 50 wt % EMC, for example, a weight ratio of EC-to-EMC in the range of about 45:55 to about 5:95, or about 35:65 to about 25:75 (e.g., about 30:70). Optionally, the liquid carrier can comprise one or more other, non-carbonate, organic solvent, such as, e.g., an ether, an ester, a lactone, an amide, a sulfone, a sulfite, or a nitrile.

In any of the embodiments described herein, the $LiPF_6$ preferably is present in the electrolyte composition at a concentration in the range of about 0.1 to about 5 M, for example, about 1 to about 1.5 M (e.g., about 1.2 M). Optionally, the composition can include one or more other lithium salt (e.g., $LiF_2BC_2O_4$, $LiBF_4$, or $LiB(C_2O_4)_2$).

In any of the embodiments described herein, the organoboron compound can be a compound of Formula (I): $Z-X_3$, in which Z is B (boron) or a boroxine ring, and each X independently is selected from vinyl, allyl, propargyl, substituted vinyl, substituted allyl, and substituted propargyl. The substituents of the substituted vinyl, allyl and propargyl groups independently can comprise one or more of alkyl and phenyl; and the alkyl and phenyl groups optionally comprise one or more substituent selected from halogen, hydroxy, amino, alkoxy, perfluoroalkyl and perfluoroalkoxy. In some preferred embodiments, each X is vinyl (e.g., as in trivinylboroxine) or a substituted vinyl. In other preferred embodiments, each X is allyl, each X is propargyl, each X is substituted allyl, or each X is substituted propargyl. As used herein, the term "vinyl" refers to $-CH=CH_2$, the term "allyl" refers to $-CH_2-CH=CH_2$, the term "propargyl" refers to $-CH_2-CH\equiv CH$, and each of the terms "boroxine" and "cycloboroxine" refers to a cyclic boron oxide having the structure:

in which each boron (B) is bonded to a vinyl, allyl, or propargyl group or a substituted form thereof. The term "substituent" refers to a group that replaces a hydrogen (H) in the vinyl, allyl or propargyl group. In some preferred embodiments, the substituents are on a carbon atom that is at least one carbon removed from the carbon attached to the boron atom.

In any of the embodiments described herein, the unsaturated organoboron compound can be present in the liquid carrier at a concentration in the range of about 0.1 to about 10 percent by weight (wt %) based on the total weight of the liquid carrier (e.g., about 0.25 to about 2 wt % or about 1 to about 5 wt %).

In some embodiments, the LiPF$_6$ is present at a concentration of about 1 to 1.5 M, and the liquid carrier comprises ethylene carbonate, ethyl methyl carbonate, and about 0.25 to about 2 wt % of the organoboron compound, based on the total weight of the liquid carrier.

In another aspect, the present invention provides lithium-ion electrochemical cells comprising an electrolyte composition as described herein in contact with an anode and a cathode, and batteries comprising a plurality of the electrochemical cells connected in series, parallel, or both series and parallel.

The electrolyte compositions described herein surprisingly and advantageously provide significant improvements in long term cell cycling performance, including multifold reductions in capacity fade measured at C/15 (e.g., up to 4 times less) and C/1.5 (up to 10 times less) cycling rates. In addition, the compositions can provide a surprising reduction (e.g., up to 4-fold reduction) in full cell impedance after long term cycling (200 cycles). Without intending to be bound by theory, it is believed that such improvements are the result of the unsaturated groups of the organoboron compounds polymerizing to form a stable, cross-linked, boron-containing polymer at the electrode surface.

DETAILED DESCRIPTION OF THE PRESENT INVENTION

The present invention provides electrolyte compositions for lithium-ion batteries, particularly high energy lithium-ion batteries. In some embodiments, an electrolyte composition comprises LiPF$_6$ in a liquid carrier comprising at least one carbonate ester solvent and at least one unsaturated organoboron compound comprising two or three unsaturated hydrocarbon groups. Each unsaturated hydrocarbon group is covalently bonded to a boron atom of the organoboron compound. The unsaturated hydrocarbon groups of the organoboron compounds can be selected from vinyl, allyl, propargyl, substituted vinyl, substituted allyl, and substituted propargyl. The substituents of the substituted vinyl, allyl and propargyl groups independently can comprise one or more of alkyl (e.g., C$_1$ to C$_6$ alkyl, such as methyl, ethyl, propyl, isopropyl, hexyl, and the like) and phenyl. The alkyl and phenyl groups optionally can bear one or more substituent selected from halogen (e.g., F, Cl, Br, I), hydroxy, amino (e.g., primary, secondary or tertiary amino groups, such as NH$_2$, methylamino, dimethylamino, diethylamino, and the like), alkoxy (e.g., C$_1$ to C$_6$ alkoxy), perfluoroalkyl (e.g. C$_1$ to C$_6$ perfluoroalkyl, such as trifluoromethyl, perfluorohexyl and the like), and perfluoroalkoxy (e.g., C$_1$ to C$_6$ perfluoroalkoxy, such as trifluoromethoxy, pentafluoroethoxy, and the like). Halogen substituted alkyl and phenyl groups preferably comprises one or more fluoro substituents, such as perfluoroalkyl and perfluorophenyl. In some preferred embodiments, the substituents are on a carbon atom that is at least one carbon removed from the carbon attached to the boron atom. The unsaturated groups are polymerizable under the operating conditions of the electrochemical cell, such that some of the organoboron compound polymerizes to form a stable SEI layer on the cathode surface.

In some embodiments, the unsaturated organoboron compound is a compound of Formula (I): Z—X$_3$, in which Z is B (boron) or a boroxine ring, and each X independently is selected from vinyl, allyl, propargyl, substituted vinyl, substituted allyl, and substituted propargyl. The substituents of the substituted vinyl, allyl and propargyl groups independently can comprise one or more of alkyl and phenyl. The alkyl and phenyl groups optionally can bear one or more substituent selected from halogen (e.g., F, Cl, Br, I), hydroxy, amino (e.g., primary, secondary or tertiary amino groups, such as NH$_2$, methylamino, dimethylamino, diethylamino, and the like), alkoxy (e.g., C$_1$ to C$_6$ alkoxy), and perfluoroalkoxy (e.g., C$_1$ to C$_6$ perfluoroalkoxy, such as trifluoromethoxy, pentafluoroethoxy, and the like). Halogen substituted alkyl and phenyl groups preferably comprises one or more fluoro substituents, such as perfluoroalkyl and perfluorophenyl.

In some other embodiments, the unsaturated organoboron compound is a compound of Formula (I): Z$^1$—(X$^1$)$_3$, in which Z$^1$ is B (boron) or a boroxine ring, and each unsaturated group, X$^1$, independently is selected from (i) and (ii):

wherein:

n is 0 or 1;

each R$^1$ independently is selected from H, alkyl (e.g., C$_1$ to C$_6$ alkyl, such as methyl, ethyl, propyl, isopropyl, hexyl, and the like), and substituted alkyl;

R$^2$ is selected from H, alkyl (e.g., C$_1$ to C$_6$ alkyl, such as methyl, ethyl, propyl, isopropyl, hexyl, and the like), and substituted alkyl; and each R$^3$ independently is selected from H, alkyl (e.g., C$_1$ to C$_6$ alkyl, such as methyl, ethyl, propyl, isopropyl, hexyl, and the like), phenyl, substituted alkyl, and substituted phenyl.

In some preferred embodiments, the $R^1$ groups are H.

In one embodiment of the compound of Formula (I), each of the unsaturated hydrocarbon groups is (i) and n is 0, in which case the unsaturated groups are vinyl groups. Preferably, at least one of $R^2$ and $R^3$ in this embodiment is H. Preferably, $Z^1$ is a boroxine ring. A preferred compound of this embodiment is trivinylboroxine (also known as trivinylcycloboroxine, tVCBO).

In another embodiment of the compound of Formula (I), each $X^1$ is (ii), and each $R^1$ preferably is H. Preferably, $Z^1$ is a boroxine ring. One preferred compound of this embodiment is tripropargylboroxine.

In another embodiment of the compound of Formula (I), each $X^1$ is (i), n is 1, and each $R^1$ preferably is H. Preferably, $Z^1$ is a boroxine ring. One preferred compound of this embodiment is triallylboroxine.

The substituents of the substituted alkyl and phenyl groups can be, e.g., one or more substituent selected from halogen (e.g., F, Cl, Br, I), hydroxy, amino (e.g., primary, secondary or tertiary amino groups, such as $NH_2$, methylamino, dimethylamino, diethylamino, and the like), alkoxy (e.g., $C_1$ to $C_6$ alkoxy such as methoxy and the like), and perfluoroalkoxy (e.g., $C_1$ to $C_6$ perfluoroalkoxy, such as trifluoromethoxy, pentafluoroethoxy, and the like). Halogen substituted alkyl and phenyl groups preferably comprises one or more fluoro substituents, such as perfluoroalkyl and perfluorophenyl.

In any of the embodiments described herein, the carbonate ester can comprise at least one compound selected from ethylene carbonate (EC), propylene carbonate (PC), dimethyl carbonate (DMC), and ethyl methyl carbonate (EMC). The carbonate ester can be a single carbonate ester or can be a mixture of two or more carbonate esters (e.g., a mixture of EC and EMC). In some embodiments the carbonate ester can be a mixture of carbonate esters comprising or consisting of less than 50 wt % EC and greater than 50 wt % EMC, for example, a weight ratio of EC-to-EMC in the range of about 45:55 to about 5:95, or about 35:65 to about 25:75 (e.g., about 30:70). Optionally, the liquid carrier can further comprise one or more non-carbonate solvents, such as an ether (e.g., tetrahydrofuran, diglyme), an ester (e.g., ethyl acetate), a nitrile (e.g., acetonitrile), a lactone (e.g. gamma-butyrolactone), an amide (e.g., N,N-dimethylacetamide), a sulfone (e.g., sulfolane), a sulfite (e.g., 1,2-propyleneglycol sulfite) and an ionic liquid (e.g., 1-ethyl-3-methylimidazolium bis(fluorosulfonyl)imide).

In any of the embodiments described herein, the $LiPF_6$ can be present in the electrolyte composition at a concentration in the range of about 0.1 to about 5 M, for example, about 1 to about 1.5 M (e.g., about 1.2 M). Optionally, the composition can include one or more other lithium salt, e.g., $LiF_2BC_2O_4$ (lithium difluorooxalatoborate; LiDFOB), $LiBF_4$, $LiB(C_2O_4)_2$ (lithium bis-oxalatoborate; LiBOB), lithium bis(fluorosulfonyl)imide (LiFSI), lithium bis-trifluoromethanesulfonimide (LiTFSI), and lithium perchlorate ($LiClO_4$).

The organoboron compound component of any of the embodiments described herein can be present in the liquid carrier at a concentration in the range of about 0.1 to about 10 wt % based on the total weight of the liquid carrier (e.g., about 0.25 to about 2 wt % or about 1 to about 5 wt %).

In some embodiments, the $LiPF_6$ is present at a concentration of about 1 to 1.5 M, and the liquid carrier comprises ethylene carbonate, ethyl methyl carbonate, and about 0.25 to about 2 wt % of the organoboron compound, based on the total weight of the liquid carrier.

In another aspect, the present invention also provides lithium-ion electrochemical cells comprising an electrolyte composition as described herein in contact with an anode and a cathode, preferably a high voltage cathode.

The invention also provides batteries comprising a plurality of the electrochemical cells connected in series, parallel, or both series and parallel.

The electrolyte compositions of the present invention are particularly useful in an electrochemical cell in combination with an anode and a high voltage (e.g., 4.5 to 5 V) cathode, particularly cathodes comprising spinel materials of the general formula $LiM_xMn_yO_4$, where M is any metal such as Ni, Cr, Co, etc. and x and y are between 0 and 2 (e.g., $LiNi_{0.5}Mn_{1.5}O_4$); layered oxides of the general formula $Li_{1+x}M_{1-x}O_2$, (x=0 to 0.5) where M is a metal or a combination of metals such as Ni, Co, Mn, etc. (e.g., the high-energy oxide $Li_{1.2}Ni_{0.15}Mn_{0.55}Co_{0.1}O_2$); and olivine materials of the general formula $Li_{1+x}M_{1-x}PO_4$, where M is a metal, such as Fe, Ni, Co, etc. (e.g., the high-voltage phosphates $LiCoPO_4$ and $LiNiPO_4$). Examples of suitable anode materials include graphite, lithium titanate ($Li_4Ti_5O_{12}$; LTO), lithium metal, tin, silicon, silicon oxide ($SiO_x$), silicon-based metal alloys ($Si_xM_y$, where M is a metal such as Sn), and the like.

Figure 1:
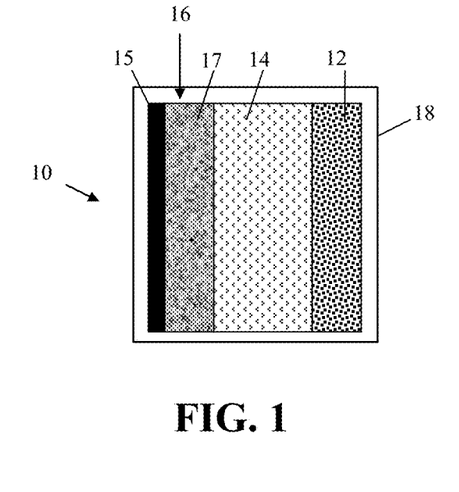
FIG. 1 schematically illustrates an electrochemical cell of the present invention.
Figure 2:
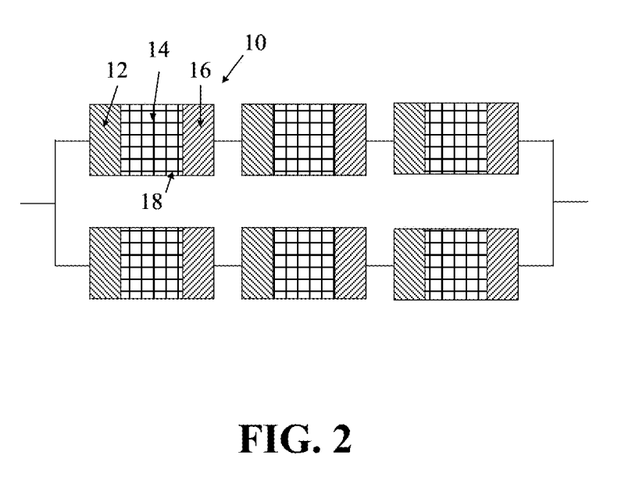
FIG. 2 schematically illustrates a battery comprising a plurality of electrochemical cells of FIG. 1.

A detailed schematic illustration of an electrochemical cell 10 of the invention is shown in FIG. 1. Cell 10 comprises negative electrode 12 separated from positive electrode 16 by an electrolyte 14, which comprises the unsaturated organoboron compound, carbonate ester-containing carrier and $LiPF_6$, being provided in electronic contact with negative electrode 12 and positive electrode 16 all contained in insulating housing 18 with suitable terminals (not shown). Electrode 16 comprises metallic collector foil 15 and active layer 17. Binders and other materials normally associated with both the electrolyte and the negative and positive electrodes are well known in the art and are not described herein, but are included as is understood by those of ordinary skill in this art. FIG. 2 provides a schematic illustration of one example of a battery in which two strings of electrochemical cells 10, described above, are arranged in parallel, each string comprising three cells 10 arranged in series. The following non-limiting examples are provided to better illustrate certain aspects of the present invention.

EXAMPLE 1

Electrochemical Cells

Electrochemical cells were prepared utilizing a high voltage cathode (positive electrode) and a carbon-based anode (negative electrode). The positive electrode was formed from a mixture of about 92 wt % $Li_{1.2}Ni_{0.15}Mn_{0.55}Co_{0.1}O_2$ layered oxide, about 4 wt % conductive carbon black, and about 4 wt % polyvinylidenedifluoride (PVDF) binder, and coating the mixture on a 20 micrometer thick aluminum current collector at an active loading density of about 5.9 mg/cm$^2$, an electrode porosity of about 36% and a coating thickness of about 26 micrometers. The negative electrode was prepared from a mixture of about 92 wt % graphite, about 2 wt % conductive carbon black, about 0.17 wt % oxalic acid, and about 6 wt % PVDF binder, by coating the mixture on a 10 micrometer thick copper current collector at an active graphite loading density of about 5.2 mg/cm$^2$, an electrode porosity of about 39% and a coating thickness of about 43 micrometers. Cells were constructed with a porous polymeric separator between the anode and cathode. The electrolytes for the cells were either (a) 1.2 M $LiPF_6$ in a 3:7

(w/w) mixture of EC:EMC (3:7, w/w) (referred to herein as "Gen2" electrolyte), or (b) Gen2 electrolyte containing about 0.25 wt % added trivinylcycloboroxine (tVCBO).

EXAMPLE 2

Electrochemical Evaluations

Figure 3:
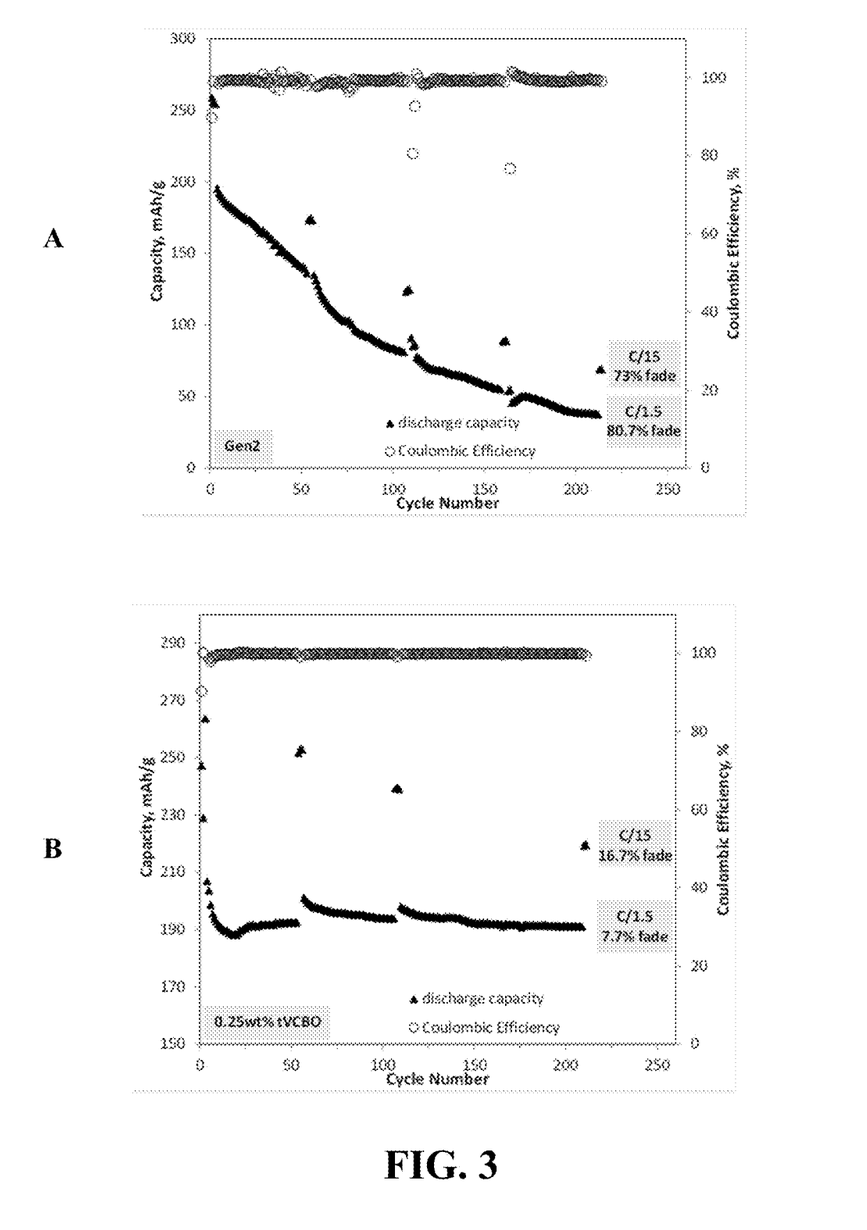
FIG. 3 provides a plot of capacity (mAh/g) versus cycle number for a comparison cell (with Gen2 electrolyte) in Panel A, and for a cell comprising tVCBO in Panel B, for about 220 cycles.

The cells of Example 1 were cycled at C/15 and C/1.5 rates between 2.2 to 4.6 V at 30° C. FIG. 3 provides a plot of capacity (mAh/g) versus cycle number for the comparison cell (with Gen2 electrolyte) in Panel (A) and for the cell comprising tVCBO in Panel (B), for about 220 cycles. The coulombic efficiency of the cells remained fairly constant in both cases. The cell with the Gen2 electrolyte experienced a 73% capacity fade when measured with a C/15 current over the course of the test, and an 80% capacity fade when measured with a C/1.5 current. Surprisingly, the cell with the electrolyte containing tVCBO experienced only a 17% capacity fade when measured with a C/15 current and only 7.7% fade when measured with a C/1.5 current.

Figure 4:
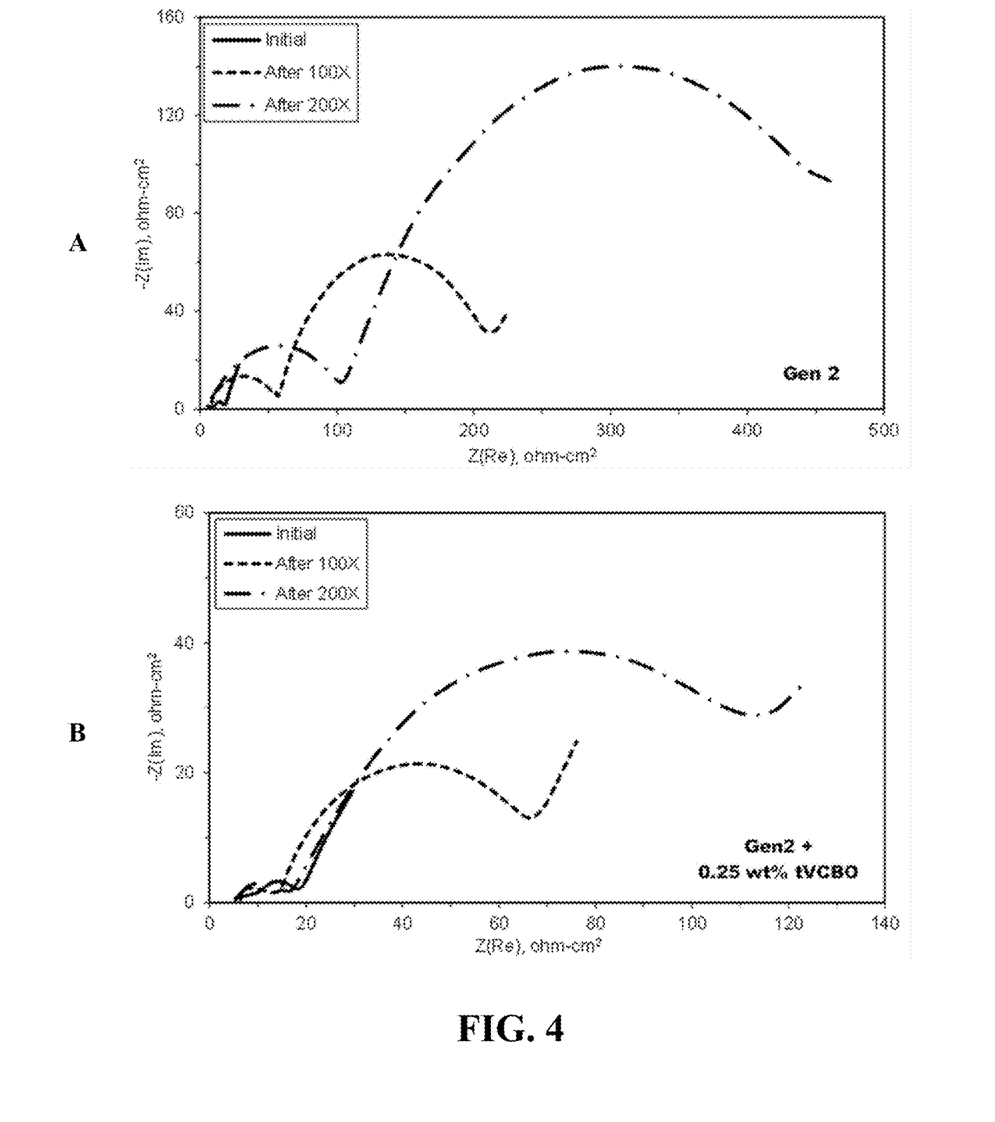
FIG. 4 provides a plot of full cell impedance results for a cell with a graphite based anode at 3.75 V, 30° C., 100 kHz, (cycling between 2.2 and 4.6 V) for an electrolyte without (Panel A) and with (Panel B) 0.25 wt % added tVCBO.
Figure 5:
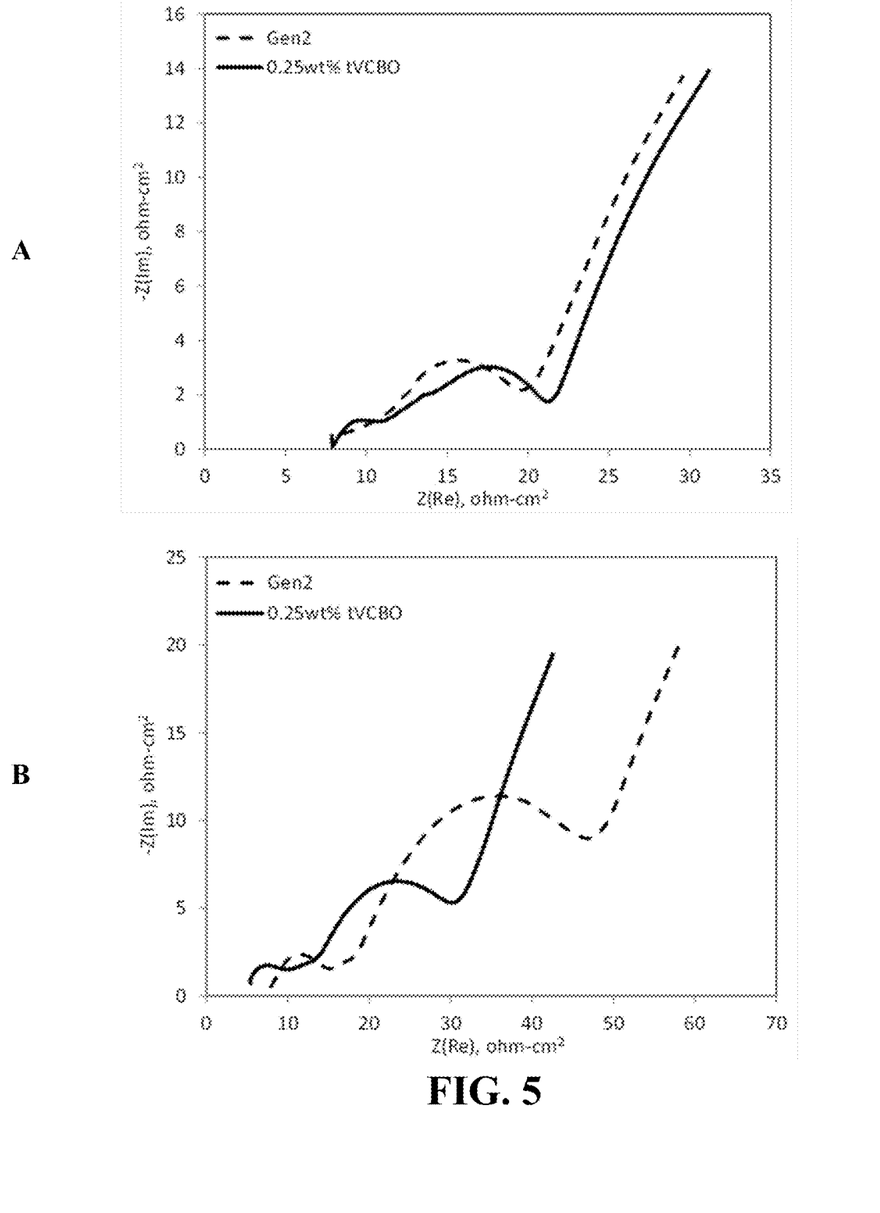
FIG. 5 provides full cell impedance results for a cell with a Li$_4$Ti$_5$O$_{12}$ based anode at 2.3 V, 30° C., 100 kHz, (cycling between 0.75 and 3.15 V) for an electrolyte without and with 0.25 wt % added tVCBO; Panel A-initial cycle; Panel B-after 220 cycles.

Full cell impedance was also evaluated for both cells at 3.75 V, 30° C., at 100 kHz, (cycling between 2.2 and 4.6 V). The presence of 0.25 wt % tVCBO (see FIG. 4, Panel B), surprisingly and significantly reduced impedance rise during long term cycle (220 cycles) relative to Gen2 electrolyte alone (FIG. 4, Panel A). Similar effects were observed using a full cell with an LTO anode in place of the graphite anode, as shown in FIG. 5, Panel A (initial cycle) and FIG. 5, Panel B (220th cycle).

Figure 6:
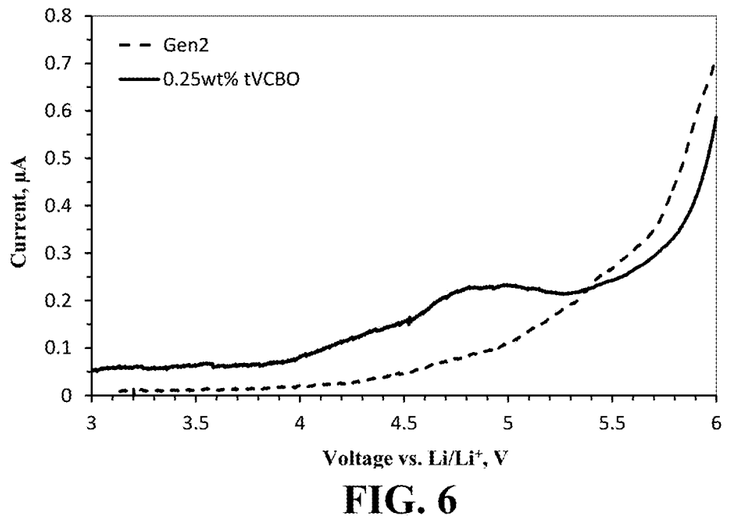
FIG. 6 illustrates linear sweep voltammetry results for a Pt/Li half-cell for an electrolyte with and without 0.25 wt % added tVCBO.
Figure 7:
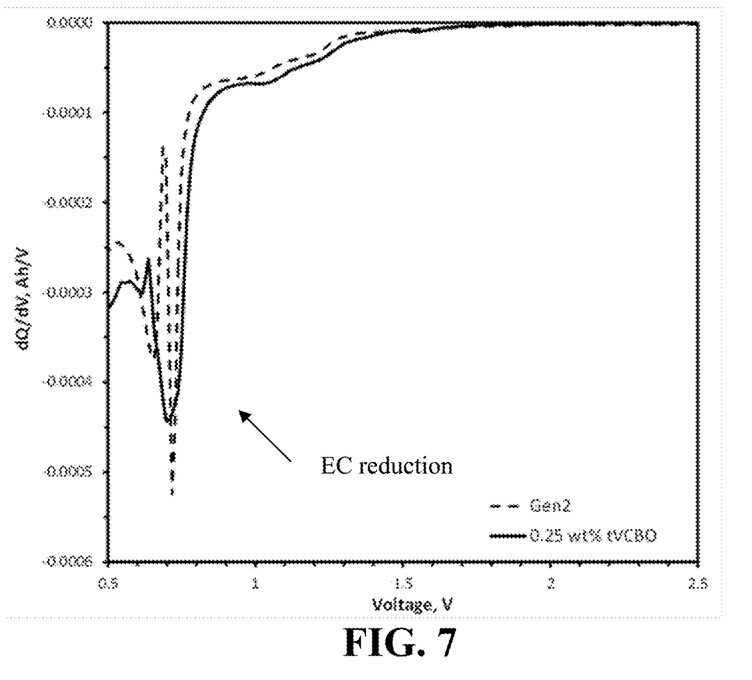
FIG. 7 illustrates reduction behavior for a graphite/Li half-cell.

Linear sweep voltammetry with both electrolytes was performed in a three electrode cell with Pt as working electrode, and Li metal as counter and reference electrodes. Addition of tVCBO to the Gen2 electrolyte showed a surprisingly lower oxidation potential compared to the Gen2 electrolyte alone (FIG. 6). Similarly, the reduction behavior of the graphite anode in both electrolytes was examined in graphite/Li half cells. Addition of tVCBO to the Gen2 electrolyte significantly altered ethylene carbonate reduction at the anode surface relative to the Gen2 electrolyte without tVCBO (FIG. 7).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The embodiments of the invention in which an exclusive property or privilege is claimed are defined as follows:

1. An electrochemical cell comprising an anode, a cathode, and a lithium-containing electrolyte contacting the anode and the cathode; the electrolyte comprising about 1 to 1.5 M $LiPF_6$ in a liquid carrier comprising a carbonate ester containing about 0.25 to about 2 percent by weight of an unsaturated organoboron compound, based on the total weight of the liquid carrier; wherein the organoboron compound comprises two or three unsaturated hydrocarbon groups, each unsaturated hydrocarbon group being covalently bonded by a carbon atom thereof to a boron atom of the organoboron compound;

wherein the unsaturated hydrocarbon groups are independently selected from vinyl, allyl, propargyl, substituted vinyl, substituted allyl, and substituted propargyl; the substituents of the substituted vinyl, allyl and propargyl groups independently comprise one or more of alkyl and phenyl; and the alkyl and phenyl groups optionally comprise one or more substituent selected from halogen, hydroxy, amino, alkoxy, and perfluoroalkoxy; and wherein the organoboron compound has the formula $Z-X_3$, wherein Z is B, and each X independently is selected from vinyl, allyl, propargyl, substituted vinyl, substituted allyl, and substituted propargyl; the substituents of the substituted vinyl, allyl and propargyl groups independently comprise one or more of alkyl and phenyl; and the alkyl and phenyl groups optionally comprise one or more substituent selected from halogen, hydroxy, amino, alkoxy, and perfluoroalkoxy; and wherein the anode comprises graphite and the cathode comprises a lithium metal oxide material providing a cell voltage of about 4.5 V to 5V.

2. The electrochemical cell of claim 1, wherein the carbonate ester comprises at least one compound selected from ethylene carbonate, propylene carbonate, dimethyl carbonate, and ethyl methyl carbonate.

3. The electrochemical cell of claim 1, wherein each X is vinyl.

4. The electrochemical cell of claim 1, wherein each X is allyl or each X is propargyl.

5. The electrochemical cell of claim 1, wherein the liquid carrier comprises ethylene carbonate, ethyl methyl carbonate, and each X is vinyl, allyl or propargyl.

6. An electrochemical cell comprising an anode, a cathode, and an electrolyte contacting the anode and the cathode; the electrolyte comprising about 1 M to 1.5 M of a lithium salt consisting of $LiPF_6$ in a liquid carrier comprising a carbonate ester containing about 0.25 to about 2 percent by weight of an organoboron compound of formula $Z-X_3$, based on the total weight of the liquid carrier, wherein Z is a boroxine ring; each X independently is selected from vinyl, allyl, propargyl, substituted vinyl, substituted allyl, and substituted propargyl; the substituents of the substituted vinyl, allyl and propargyl groups independently comprise one or more of alkyl and phenyl; and the alkyl and phenyl groups optionally comprise one or more substituent selected from halogen, hydroxy, amino, alkoxy, and perfluoroalkoxy; and wherein the anode comprises graphite and the cathode comprises a lithium metal oxide material providing a cell voltage of about 4.5 V to 5 V.

7. The electrochemical cell of claim 6, wherein the carbonate ester comprises at least one compound selected from ethylene carbonate, propylene carbonate, dimethyl carbonate, and ethyl methyl carbonate.

8. The electrochemical cell of claim 6, wherein each X is vinyl.

9. The electrochemical cell of claim 6, wherein the carbonate ester comprises a mixture of less than 50 percent by weight ethylene carbonate and greater than 50 percent by weight ethyl methyl carbonate.

10. An electrochemical cell comprising an anode, a cathode, and an electrolyte contacting the anode and the cathode; the electrolyte comprising about 1 M to about 1.5 M of a lithium salt consisting of $LiPF_6$ in a liquid carrier comprising a carbonate ester and about 0.25 percent by weight of trivinylboroxine, based on the total weight of the liquid carrier, wherein the anode comprises graphite, and the cathode comprises a lithium nickel/manganese/cobalt oxide material providing a cell voltage of about 4.5 V to 5 V.

11. The electrochemical cell of claim 10, wherein the carbonate ester comprises at least one compound selected from ethylene carbonate, propylene carbonate, dimethyl carbonate, and ethyl methyl carbonate.

12. The electrochemical cell of claim 10, wherein the carbonate ester comprises ethylene carbonate and ethyl methyl carbonate in a respective weight ratio of about 3:7.

13. The electrochemical cell of claim 10, wherein the $LiPF_6$ is present in the electrolyte at a concentration of about 1.2 M.

14. The electrochemical cell of claim 10, wherein the cathode comprises a lithium metal oxide material of formula $Li_{1+x}M_{1-x}O_2$, wherein x is in the range of 0 to 0.5, and wherein M comprises a combination of Ni, Co, and Mn.

15. The electrochemical cell of claim 10, wherein the cathode comprises a lithium metal oxide material of formula $Li_{1.2}Ni_{0.15}Mn_{0.55}Co_{0.1}O_2$.

16. The electrochemical cell of claim 6, wherein the cathode comprises a lithium metal oxide material of formula $Li_{1+x}M_{1-x}O_2$, wherein x is in the range of 0 to 0.5, and wherein M comprises a combination of Ni, Co, and Mn.

17. The electrochemical cell of claim 6, wherein the cathode comprises a lithium metal oxide material of formula $Li_{1.2}Ni_{0.15}Mn_{0.55}Co_{0.1}O_2$.

18. A battery comprising a plurality of the electrochemical cells of claim 1 connected in series, in parallel, or both in series and in parallel.

19. A battery comprising a plurality of the electrochemical cells of claim 6 connected in series, in parallel, or both in series and in parallel.

20. A battery comprising a plurality of the electrochemical cells of claim 10 connected in series, in parallel, or both in series and in parallel.

* * * * *